United States Patent
Shi et al.

(10) Patent No.: US 10,414,233 B2
(45) Date of Patent: Sep. 17, 2019

(54) MULTI-BEARING-POINT INDEPENDENT SUSPENSION

(71) Applicant: SHANGHAI LUNLIANG MECHANICAL AND ELECTRICAL SCIENCE-TECHNOLOGY CO., LTD, Shanghai (CN)

(72) Inventors: Yu Shi, Beijing (CN); Yanqi Xing, Jilin Province (CN); Hui Liu, Siping (CN); Jiatao Tian, Siping (CN); Taifeng Liu, Siping (CN); Bingwen Yan, Siping (CN); Tongchao Han, Jilin (CN); Guoxiang Shi, Changchun (CN)

(73) Assignee: SHANGHAI LUNLIANG MECHANICAL AND ELECTRICAL SCIENCE-TECHNOLOGY CO., LTD., Shanghai (CN)

( * ) Notice: Subject to any disclaimer, the term of this patent is extended or adjusted under 35 U.S.C. 154(b) by 146 days.

(21) Appl. No.: 15/545,445

(22) PCT Filed: Oct. 30, 2015

(86) PCT No.: PCT/CN2015/093307
§ 371 (c)(1),
(2) Date: Jul. 21, 2017

(87) PCT Pub. No.: WO2016/115933
PCT Pub. Date: Jul. 28, 2016

(65) Prior Publication Data
US 2018/0009281 A1      Jan. 11, 2018

(30) Foreign Application Priority Data

Jan. 22, 2015   (CN) .......................... 2015 1 0030965

(51) Int. Cl.
*B60G 13/00*       (2006.01)
*B60G 3/20*        (2006.01)
(Continued)

(52) U.S. Cl.
CPC ............. *B60G 13/003* (2013.01); *B60G 3/18* (2013.01); *B60G 3/20* (2013.01); *B60G 7/008* (2013.01);
(Continued)

(58) Field of Classification Search
CPC ................................ B60G 3/20; B60G 13/003
See application file for complete search history.

(56) References Cited

U.S. PATENT DOCUMENTS 2,148,029 A * 2/1939 Matthews ............ B60G 11/181
                                                     267/273
2,347,948 A * 5/1944 Hassett .................. B60G 11/14
                                                     267/249

(Continued)

FOREIGN PATENT DOCUMENTS

CN      101648573 A      2/2010
CN      202986930 U      6/2013
(Continued)

OTHER PUBLICATIONS

International Search Report dated Feb. 6, 2016 for PCT/CN2015/093307.
EP Search Report for EP15878601.2, dated Sep. 4, 2018, 11 pages.

*Primary Examiner* — Nicole T Verley

(57) ABSTRACT

An independent suspension comprises upper and lower fork arms, elastic elements, shock absorber and fork arm positioning pivots. The fork arms are A-shaped, front ends of the fork arms respectively connect to upper and lower suspension points of a wheel, and rear ends of the fork arms connect to a vehicle frame through the elastic elements. The shock absorber mounts on top of the front end of the upper (Continued)

fork arm. Vehicle frame bearing pivot points and transmission parts are constructed on peripheries of the upper and lower fork arms. The arrangement absorbs bearing elastic forces by changing directions of force and the arms of force, to form multiple points supporting multiple elastic elements, so force applied on the wheel is distributed by multiple points, increasing average running speed. Increasing the number and arrangement of the elastic elements reduces vehicle height, optimizes space utilization and improves stability and running smoothness.

2 Claims, 19 Drawing Sheets

(51) Int. Cl.
| | | |
|---|---|---|
| *B60G 11/50* | (2006.01) | |
| *B60G 3/18* | (2006.01) | |
| *B60G 7/00* | (2006.01) | |
| *B60G 11/18* | (2006.01) | |
| *B60G 11/20* | (2006.01) | |
| *B60G 15/00* | (2006.01) | |

(52) U.S. Cl.
CPC ............ *B60G 11/181* (2013.01); *B60G 11/20* (2013.01); *B60G 11/50* (2013.01); *B60G 15/00* (2013.01); *B60G 2200/1322* (2013.01); *B60G 2200/144* (2013.01); *B60G 2204/143* (2013.01); *B60G 2204/416* (2013.01); *B60G 2204/421* (2013.01); *B60G 2204/422* (2013.01)

(56) References Cited

U.S. PATENT DOCUMENTS

| | | | | |
|---|---|---|---|---|
| 4,881,752 A * | 11/1989 | Tanaka | ............ | B60G 3/20 |
| | | | | 280/124.128 |
| 5,431,429 A * | 7/1995 | Lee | ............ | B60G 3/20 |
| | | | | 280/124.136 |
| 5,597,171 A * | 1/1997 | Lee | ............ | B60G 3/20 |
| | | | | 280/124.138 |
| 5,620,199 A * | 4/1997 | Lee | ............ | B60G 3/265 |
| | | | | 280/124.138 |
| 5,984,330 A * | 11/1999 | Hasshi | ............ | B60G 3/265 |
| | | | | 280/124.146 |
| 6,170,838 B1 * | 1/2001 | Laurent | ............ | B60G 3/01 |
| | | | | 280/124.127 |
| 6,641,152 B1 | 11/2003 | Suzuki | | |
| 7,401,794 B2 * | 7/2008 | Laurent | ............ | B60G 3/01 |
| | | | | 280/124.134 |
| 7,407,174 B2 * | 8/2008 | Kusaka | ............ | B60G 3/20 |
| | | | | 280/124.136 |
| 7,793,946 B2 * | 9/2010 | Vaxelaire | ............ | B60G 3/26 |
| | | | | 280/5.521 |
| 7,793,955 B2 * | 9/2010 | Suzuki | ............ | B60G 3/26 |
| | | | | 280/124.135 |
| 7,914,020 B2 * | 3/2011 | Boston | ............ | B60G 3/20 |
| | | | | 280/124.136 |
| 7,934,735 B2 | 5/2011 | Kuwabara | | |
| 8,662,510 B2 * | 3/2014 | Christensen | ............ | B60G 3/26 |
| | | | | 280/124.134 |
| 8,882,116 B2 * | 11/2014 | Cuttino | ............ | B60G 3/26 |
| | | | | 280/124.106 |
| 9,895,949 B2 * | 2/2018 | Lu | ............ | B60F 3/003 |
| 2002/0027332 A1 | 3/2002 | Behr | | |
| 2002/0125674 A1 * | 9/2002 | Walker | ............ | B60G 3/20 |
| | | | | 280/124.106 |
| 2003/0234504 A1 | 12/2003 | Frantzen | | |

FOREIGN PATENT DOCUMENTS

| | | |
|---|---|---|
| CN | 203543564 U | 4/2014 |
| CN | 104589943 A | 5/2015 |
| CN | 204432281 U | 7/2015 |
| CN | 204641300 U | 9/2015 |
| JP | S5769705 U1 | 4/1982 |
| JP | S62143775 A | 6/1987 |
| JP | H27109 U | 1/1990 |
| JP | H03231010 A | 10/1991 |
| JP | H49313 U | 1/1992 |
| JP | H1159151 A | 3/1999 |
| JP | 2009126203 A | 6/2009 |

* cited by examiner

MULTI-BEARING-POINT INDEPENDENT SUSPENSION

TECHNICAL FIELD

The present application relates to an element applied to a vehicle chassis, which falls into the technical field of a passenger or commercial vehicle and is an innovative vehicle suspension system.

BACKGROUND ART

A suspension is a general title for any transmission force connecting means between a vehicle frame (axle) and wheels, which is intended to transmit a force acting between the wheels and the vehicle frame, and to dampen an impact transferred to the vehicle frame or vehicle body from an uneven road surface, and to attenuate vibrations caused thereby, so as to ensure smooth running of the vehicle.

Early vehicles usually take rigid axle suspensions in which leaf springs serve as elastic elements. Later on, leaf springs were replaced by coil springs, torsion bar springs, air springs, rubber springs, hydro-pneumatic springs and so on. At present, high-level vehicles generally employ independent suspensions, such as transverse arm type, trailing arm type, single oblique arm type, sliding pillar type, Macpherson type, multi-link and active suspension, etc.

A double wishbone independent suspension is a widely used suspension type. The double wishbone independent suspension has a rather small surrounding space, and is staggered with the power shaft, steering rod, balance bar and elastic element within the same space. That is, elastic elements and shock absorbers are suspended from it at a single point vertically. Over the years that the double wishbone independent suspension has been put into application, due to such factors as having too many structural parts, ever-changing environment, frequent change in carrying, continuous work, limited bearing point space, and the like, no modification or innovation has been made thereto.

SUMMARY OF INVENTION

An output type multi-bearing-point independent suspension according to the present application is an innovative independent suspension system. Appropriate symmetric bearing points are selected by computing with the principle of moments. Corresponding available space is expanded around the upper fork arm and the lower fork arm, to construct appropriate bearing points and transmission parts of the vehicle frame. By utilizing the lever principle, the torsion bar principle and the principle of moments, double fork arm shaft hanging point motion can absorb bearing elastic force by means of changing directions of force and the arms of force, so as to change points supporting an elastic elements and to form multiple points supporting a plurality of elastic elements, such that the force applied on the wheel is distributed by multiple points. At the same time, applying mechanical principles, different elastic elements may be used to allow the suspension to be adapted to vehicle technical requirements, so as to improve the technical parameters of the running system.

The present application is intended to expand the useful space of the vehicle suspension, with duplex calculation, so as to position and adjust the vehicle frame bearing structure, and to adjust and modify the vehicle frame bearing structure into a new bearing structure by changing a single-point load bearing arrangement into a multi-point bearing decomposition arrangement, and replace a single group of elastic elements with multiple groups of elastic elements to thereby provide smooth and safe running, and a comfortable riding experience.

The present application comprises an upper fork arm, a lower fork arm, elastic elements, a shock absorber and fork arm positioning shafts; the upper fork arm and the lower fork arm are A-shaped structural parts, the front ends of the upper fork arm and the lower fork arm are respectively connected with the upper suspension point and lower suspension point of a wheel through main pins, and the rear ends of the upper fork arm and/or the lower fork arm are connected with a vehicle frame through the elastic elements, the shock absorber is mounted on top of the front end of the upper arm. On this basis, there are five technical solutions:

According to a first aspect of the application, there is provided an arm direct transmission independent suspension, wherein the middle portions of the upper and lower fork arms are connected to the vehicle frame by fork arm positioning shafts respectively, and an elastic member is provided between the bottom of the rear end of the upper fork arm and the vehicle frame. An elastic member may be provided between the bottom of the rear end of the lower arm and the vehicle frame.

According to a second aspect of the present application, there is provided a torsion bar direct transmission independent suspension, wherein the rear ends of the upper and lower fork arms are connected to the vehicle frame by a torsion bar and a torsion bar seat.

According to a third aspect of the application, there is provided a link rod joint transmission independent suspension, wherein the rear ends of the upper and lower fork arms are respectively connected to the vehicle frame by a fork arm positioning shaft, and two fork arm hanging pivots extend from a bottom of the front portion of the upper fork arm, each fork arm handing pivot having a lower end connected with an output lever by a link rod, and a middle portion of the output lever is hinged to the vehicle frame by means of an output lever rotating shaft and an elastic element is arranged between a bottom of another end of the output lever and the vehicle frame. Two fork arm hanging pivots may also extend from a bottom of the front portion of the lower fork arm, and each fork arm hanging pivot is connected to the output lever by means of a link rod, and a middle portion of the output lever is hinged to the vehicle frame by means of an output lever rotating shaft and an elastic element is arranged between a bottom of another end of the output lever and the vehicle frame.

According to a fourth aspect of the application, there is provided an angled arm transmission independent suspension, wherein rear ends of the upper and lower fork arms are connected respectively to the vehicle frame by a fork arm positioning shaft, and each of opposite sides of a front portion of the upper fork arm is hinged with a connecting arm, and another end of the connecting arm is hinged to an end of the right-angled output arm, and another end of the right-angled output arm is connected with an elastic element, and another end of the elastic element is fixed to the vehicle frame. The right-angled output arm has a right-angled output arm rotating shaft, and the right angled output arm rotating shaft is pivotally connected to the vehicle frame. Each of opposite sides of a front portion of the lower fork arm may also be hinged with a connecting arm, and another end of the connecting arm is hinged to an end of the right-angled output arm, another end of the right-angled output arm is connected with an elastic element, and another end of the elastic element is fixed to the vehicle frame. The right-angled output arm has a right-angled output arm rotating shaft, and the right angled output arm rotating shaft is pivotally connected to the vehicle frame.

According to a fifth aspect of the present application, there is provided a torsion spring direct transmission independent suspension, wherein rear ends of the upper and lower fork arms are connected to the vehicle frame by a torsion bar and a torsion bar seat, and a shock absorber is mounted between the top of the front end of the upper fork arm and the vehicle frame. Up and down bouncing of the wheel brings about an upward movement of the front end of the upper fork arm, and the upper fork arm rotates about a rear fixing point, such that two torsional springs arranged symmetrically on two sides produce a torsional deformation which has the effect of shock absorption. A shock absorber is mounted on the top of the front end of the upper fork arm. In operation, the wheel brings about upward bouncing of the suspension point of a front wheel, and the shock absorber has a dampening effect. When the wheel bounces up and down, the shock absorber and the torsion spring bear forces on multiple points which act in cooperation. Moreover, the upper and lower fork arms may each be provided with a torsion spring elastic element, such that more hanging points may distribute the impact produced by bouncing of the wheels, so as to produce a better shock absorption effect.

The present application in which a balanced lever is used to transmit force to an output lever avoids the situation in which the momentum of the vertical upward impact on the vehicle body is transmitted by a single point, such that the fork arm positioning shaft serves as a fulcrum, such that the other two hanging points are movable within the vehicle horizontally, vertically and perpendicularly, to compress the elastic elements, and change the direction of the forces so as to reduce the impact on the vehicle.

By duplex calculation, the bearings are located, and selection of positions of fork arm hanging shafts, link rods and so on as well as layout of levers are determined, resulting in effective use of space, finding the target of new multiple hanging and bearing points and a stable structure, to achieve an articulated bearing of an axleless vehicle frame and the suspension in which a new axleless frame may be used in cooperation.

The present application, based on the condition of double fork arms, fork arm positioning shafts and output lever trajectory, selects appropriate position of the fork arm or the fork arm hanging shaft with the lever principle and scientific calculation, and a corresponding solution for selection of the direction and position of the final bearing points which output the force can be selected according to the vehicle frame space and structure.

The use condition of the present application is that a traditional vehicle frame is difficult to be adapted to achieve the effect, but a wheel-beam type axleless vehicle frame should be used therewith.

The present application has advantageous effects as the following:

1. Effective and integrated use of existing space, with a single force bearing point scattered into a number of force bearing points, capable of changing the direction of force, without affecting the layout and functions of other parts, and enhancing the overall vehicle running performance.

2. One end of the suspension directly connected to the wheel, impact load distributed on multiple points, with direction changed, so that the average driving speed is increased.

3. Increase in the number of elastic elements, and reasonable layout thereof, can reduce the height of the vehicle, optimize space utilization, and enhance the stability of the vehicle and riding comfort.

4. Adjustable wheel jumping movement stroke and elastic element force bearing section arrangement.

5. Easy to set the chassis height according to different road conditions.

6. To be used with such a running system as an axleless vehicle frame, capable of accelerating development of electrical, light weighted, and intelligent vehicle.

DETAILED DESCRIPTION OF PREFERRED EMBODIMENTS

Interpretation of Terms:

Fork arm positioning axis point: fork arm positioning axis point as recited in the present application refers to rotation axis point at which the upper or lower fork arm rotationally connected with the vehicle frame.

Fork arm shaft hanging point: fork arm shaft hanging point as recited in the present application refers to fixed rotation axis point of a newly built link rods of upper or lower fork arm.

Support pillar axis point: support pillar axis point as recited in the present application refers to pillar axis point which supports the output lever or right-angled output arm and is in the same position as rotation axis of output lever or right-angled output arm.

Front and rear end pivot points of the output rod: front and rear end pivot points of the output rod as recited in the present application, front end pivot point refers to rotation points of link rod and the output lever or right-angled output arm, and the rear end pivot point refers to connecting axis point of elastic element or shock absorber element.

Figure 1:
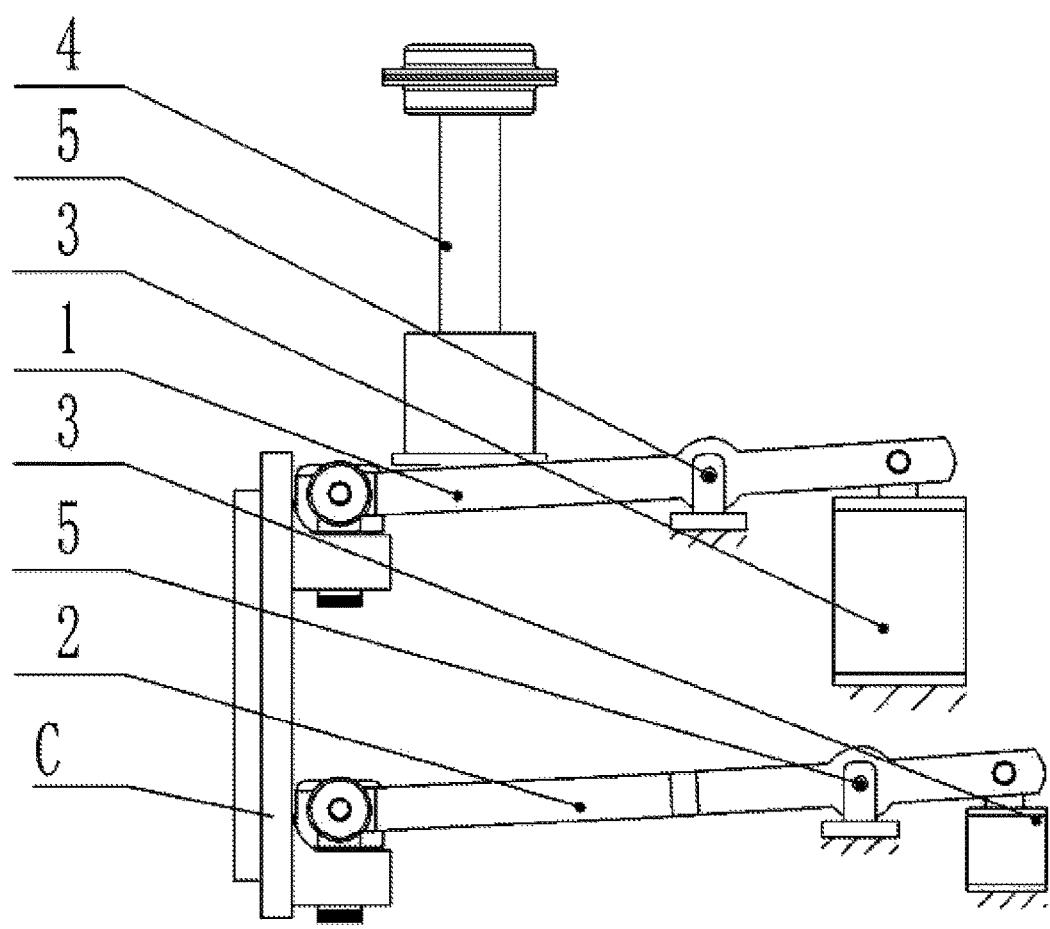
FIG. 1 is a side view of a first embodiment according to the present application in which a fork arm positioning shaft is provided (referred to as a fork arm direct transmission independent suspension).

In order to enable a person skilled in the art to understand the description of the present application more clearly, some terms indicating direction and position are clarified as below: "front end", "front portion" of upper fork arm 1 and lower fork arm 2 refer to position adjacent to apex of an A-shaped structural element of the upper fork arm 1 and the lower fork arm 2; "rear end" refers to position away from apex of the A-shaped structural element; "top" and "bottom" are each based on position as shown in FIG. 1. "Middle portion" represents a portion adjacent to an intermediate position of the upper fork arm 1 and the lower fork arm 2.

The present application can be implemented in the following embodiments:

A First Embodiment: Fork Arm Direct Transmission Independent Suspension

Figure 2:
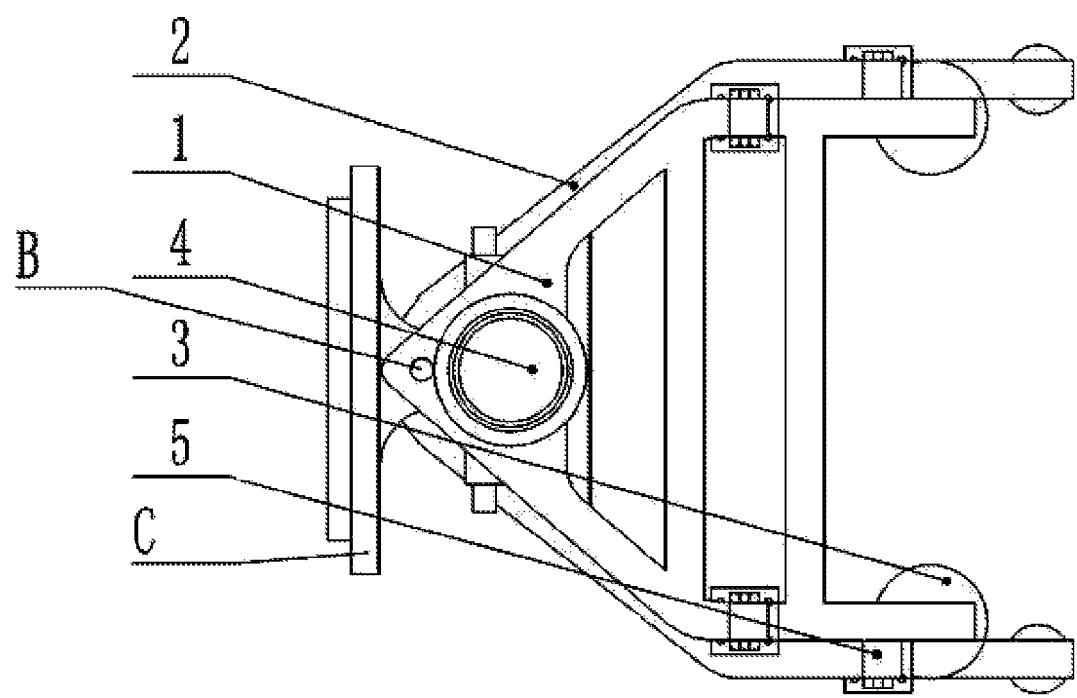
FIG. 2 is a top view of the embodiment of FIG. 1.
Figure 3:
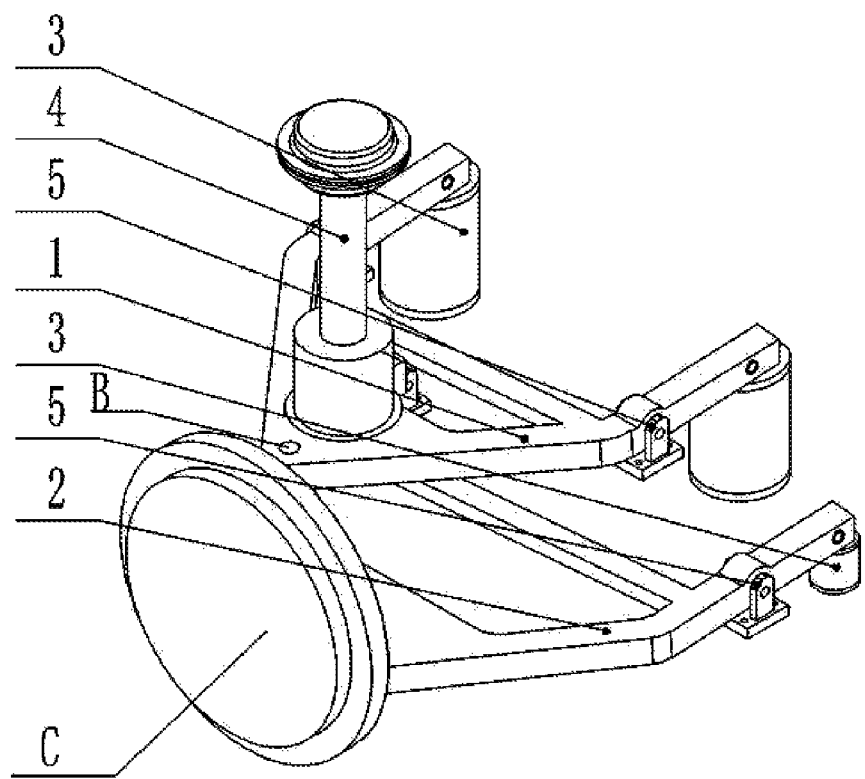
FIG. 3 is an isometric view of the embodiment of FIG. 1.

This embodiment employs a manner of changing direction of force by a fork arm positioning shaft, and is shown in FIGS. 1, 2 and 3.

The independent suspension of this embodiment comprises an upper fork arm 1, a lower fork arm 2, elastic elements 3, a shock absorber 4 and fork arm positioning shafts 5; the upper fork arm 1 and the lower fork arm 2 are A-shaped structural elements, front ends of the upper fork arm 1 and the lower fork arm 2 are respectively connected with an upper suspension point and a lower suspension point of a wheel C through main pins B, middle portions of the upper fork arm 1 and lower fork arm 2 are connected to the vehicle frame by fork arm positioning shafts 5 respectively, and an elastic element 3 is provided between a bottom of the rear end of the upper arm 1 and the vehicle frame.

Figure 4:
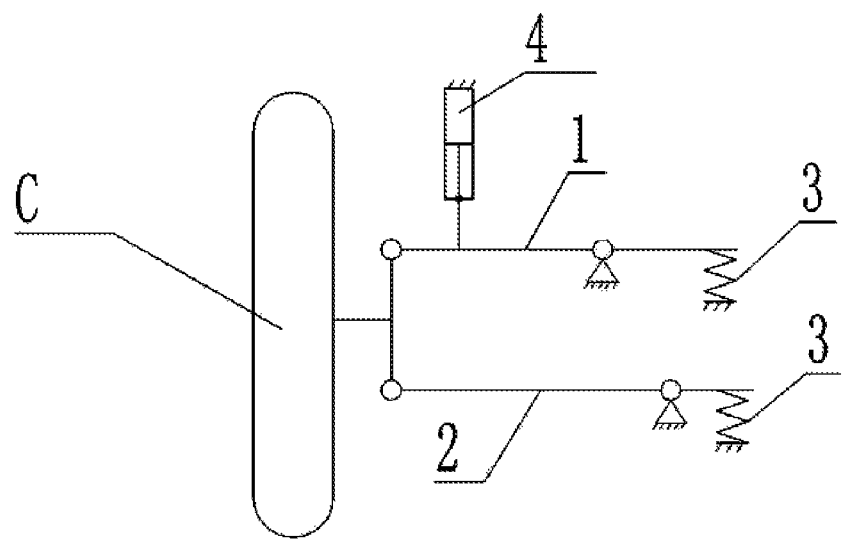
FIG. 4 is a schematic view of the embodiment of FIG. 1.
Figure 5:
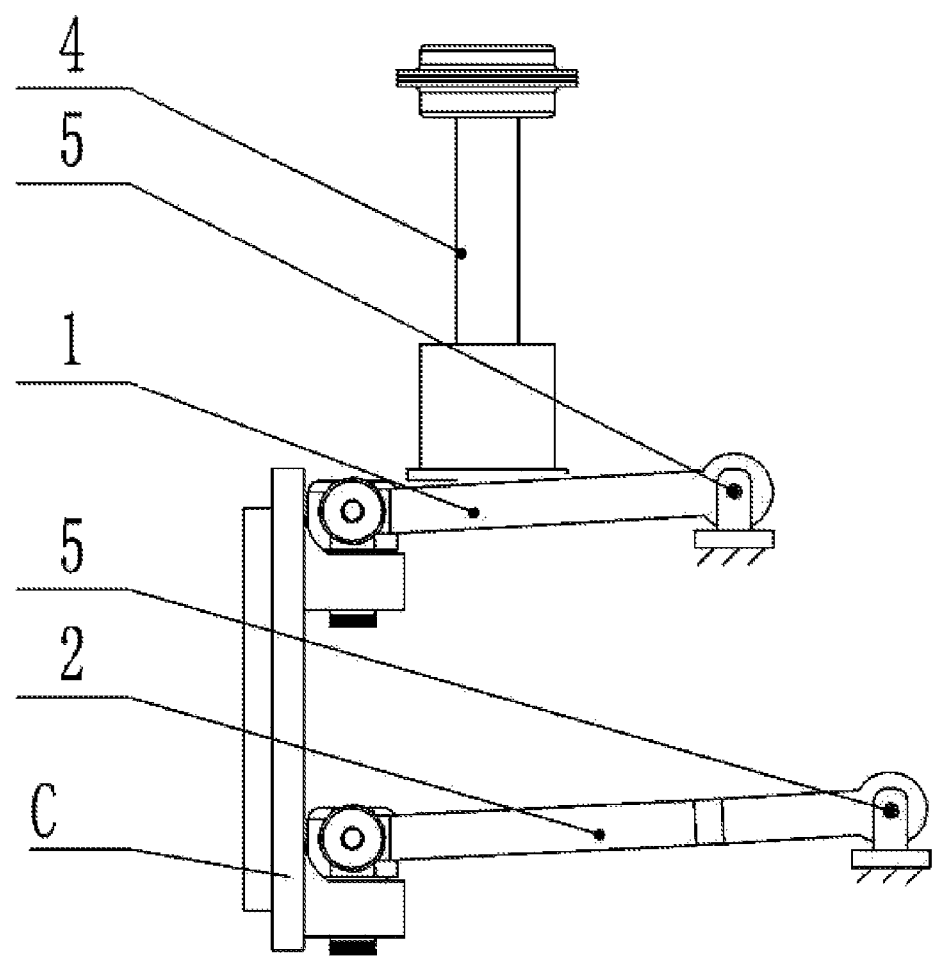
FIG. 5 is a view of a second embodiment according to the present application in which a torsion bar twisting around an axis of a fork arm positioning shaft is provided (referred to as a torsion bar direct transmission independent suspension).
Figure 6:
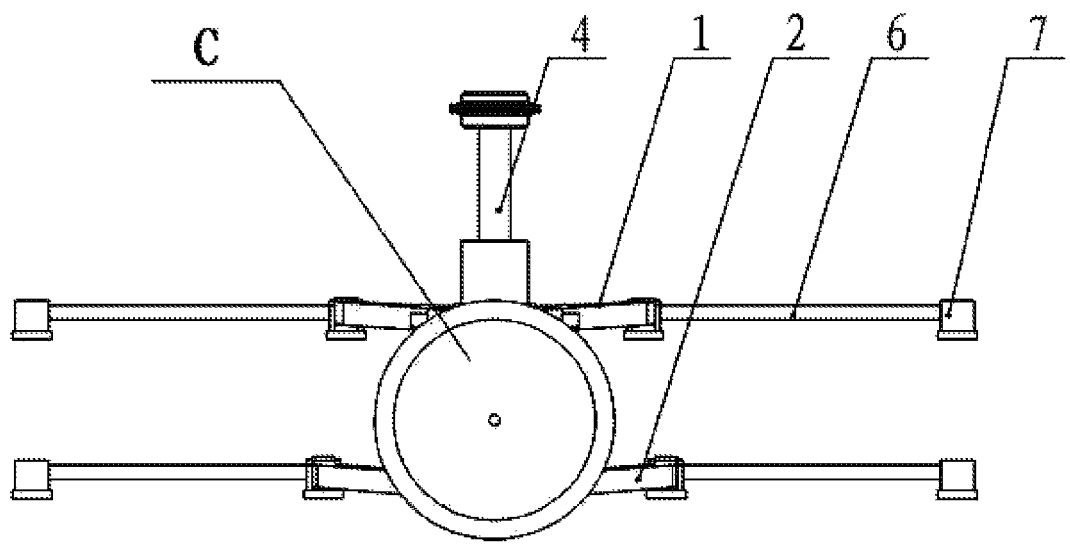
FIG. 6 is a side view of the embodiment of FIG. 5.
Figure 7:
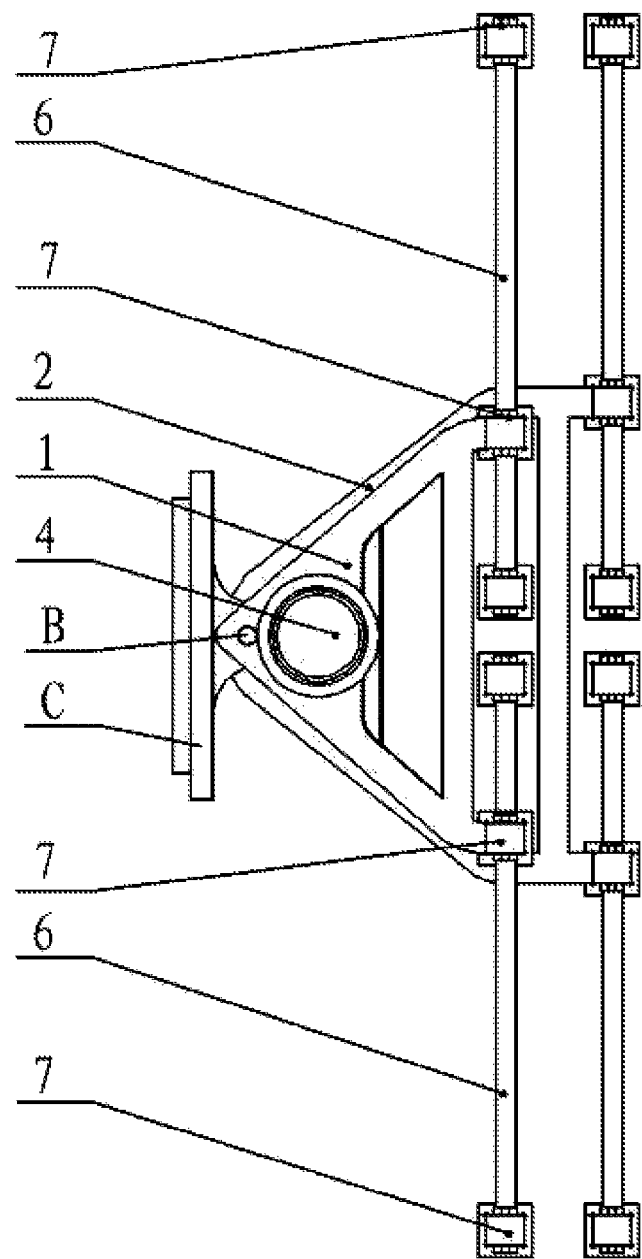
FIG. 7 is a top view of the embodiment of FIG. 5.
Figure 8:
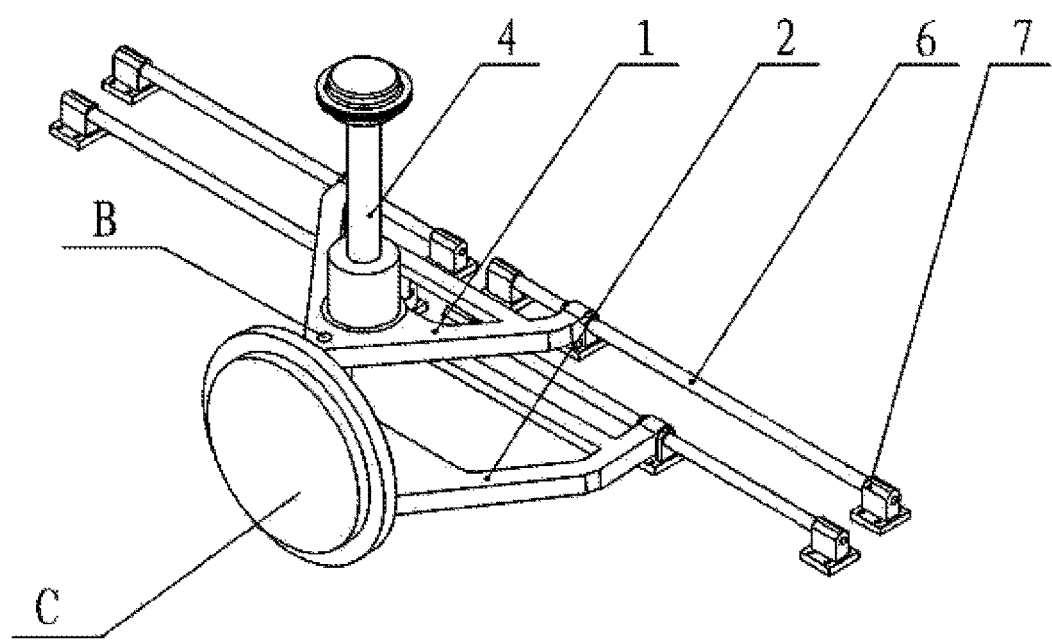
FIG. 8 is an axonometric view of the embodiment of FIG. 5.

An elastic element 3 may also be provided between a bottom of a rear end of the lower fork arm 2 and the vehicle frame, as shown in FIG. 4.

Rear ends of the upper fork arm 1 and lower fork arm 2 extend to form levers. By means of changing direction by the fork arm positioning shaft 5, an upward movement stroke of the front end of the upper fork arm 1 is changed into a downward movement stroke, and the downward movement stroke acts on two elastic elements 3 disposed symmetrically on the rear ends, so as to produce the effect of shock absorption. Rear extension sections of the upper fork arm 1 and the lower fork arm 2, as required by spatial position, may extend directly, or deflect by an angle inwardly, outwardly, upwardly or downwardly, to form a plurality of arrangements so as to be adapted to various vehicle types or vehicle frames. A shock absorber 4 is mounted on top of the front end of the upper fork arm 1. In operation, when the wheel brings about upward bouncing of the front end of the upper fork arm 1 suspension point, the shock absorber 4 produces a dampening effect.

The elastic element 3 is disposed according to position and manner. The elastic element 3 of the upper fork arm 1 may be provided as an air spring. As for the lower fork arm 2, due to spatial position limitations, its elastic element 3 may comprise an elastic rubber block having a small size or an elastic element having a corresponding size. When the wheel bounces up and down, the shock absorber 4 and the elastic elements 3 are subject to forces simultaneously and act in cooperation. Elastic element 3 may be disposed only on the upper fork arm 1, or may be disposed both on the upper fork arm 1 and the lower fork arm 2 which may produce a better shock absorption effect.

A Second Embodiment: Torsion Rod Direct Transmission Independent Suspension

This embodiment employs is a manner of twisting a torsion bar around an axis of a fork arm positioning shaft, and is shown in FIGS. 5, 6, 7 and 8.

The independent suspension of this embodiment comprises an upper fork arm 1, a lower fork arm 2, fork arm positioning shafts 5, torsion rods 6, a shock absorber 4 and torsion rod seats 7. The upper fork arm 1 and the lower fork arm 2 are A-shaped structural elements, front ends of the upper fork arm 1 and the lower fork arm 2 are respectively connected with an upper suspension point and a lower suspension point of a wheel C through main pins B, rear ends of the upper fork arm 1 and lower fork arm 2 are connected to the vehicle frame by a torsion rod 6 and a torsion rod seat 7, and a shock absorber 4 is mounted between top of the front end of the upper arm 1 and the vehicle frame.

Bouncing of the wheel C brings about an upward movement of the front end of the upper fork arm 1, and the upper fork arm 1 rotates about a rear fixing point, such that two torsion rods 6 arranged symmetrically on two sides produce a torsional deformation which has the effect of shock absorption. A shock absorber 4 is mounted on top of the front end of the upper fork arm 1. In operation, the wheel C brings about upward bouncing of the suspension point of the wheel, the shock absorber 4 which has a dampening effect. Said shock absorber 4 is mounted between the front end of the upper fork arm 1 and the vehicle frame, when the wheel bounces up and down, the shock absorber 4 and the torsion rod 6 are subject to forces on multiple points simultaneously and act in cooperation. Moreover, the upper and lower fork arms may each be provided with torsion rods, such that more hanging points may distribute the impact produced by bouncing of the wheels, so as to produce a better shock absorption effect.

A Third Embodiment: Link Rod Joint Transmission Independent Suspension

Figure 9:
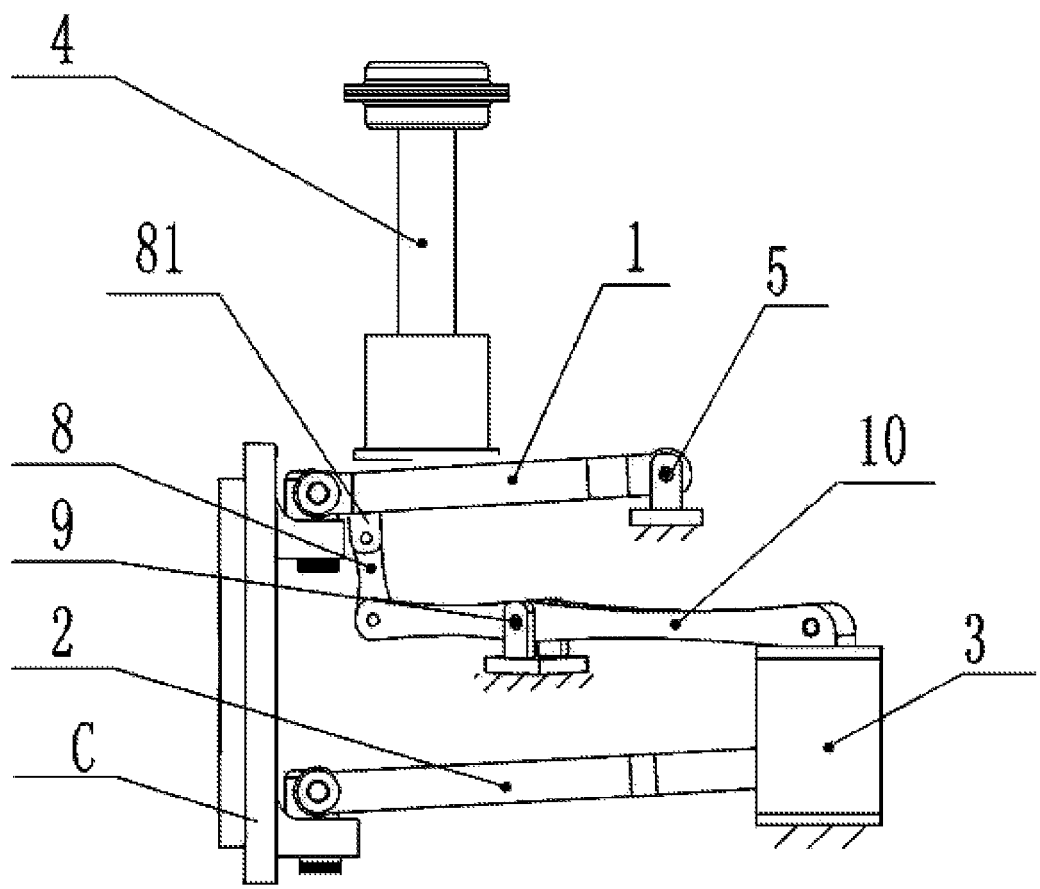
FIG. 9 is a cross-sectional view of a third embodiment according to the present application in which an output lever is provided (referred to as a link rod joint transmission independent suspension).
Figure 10:
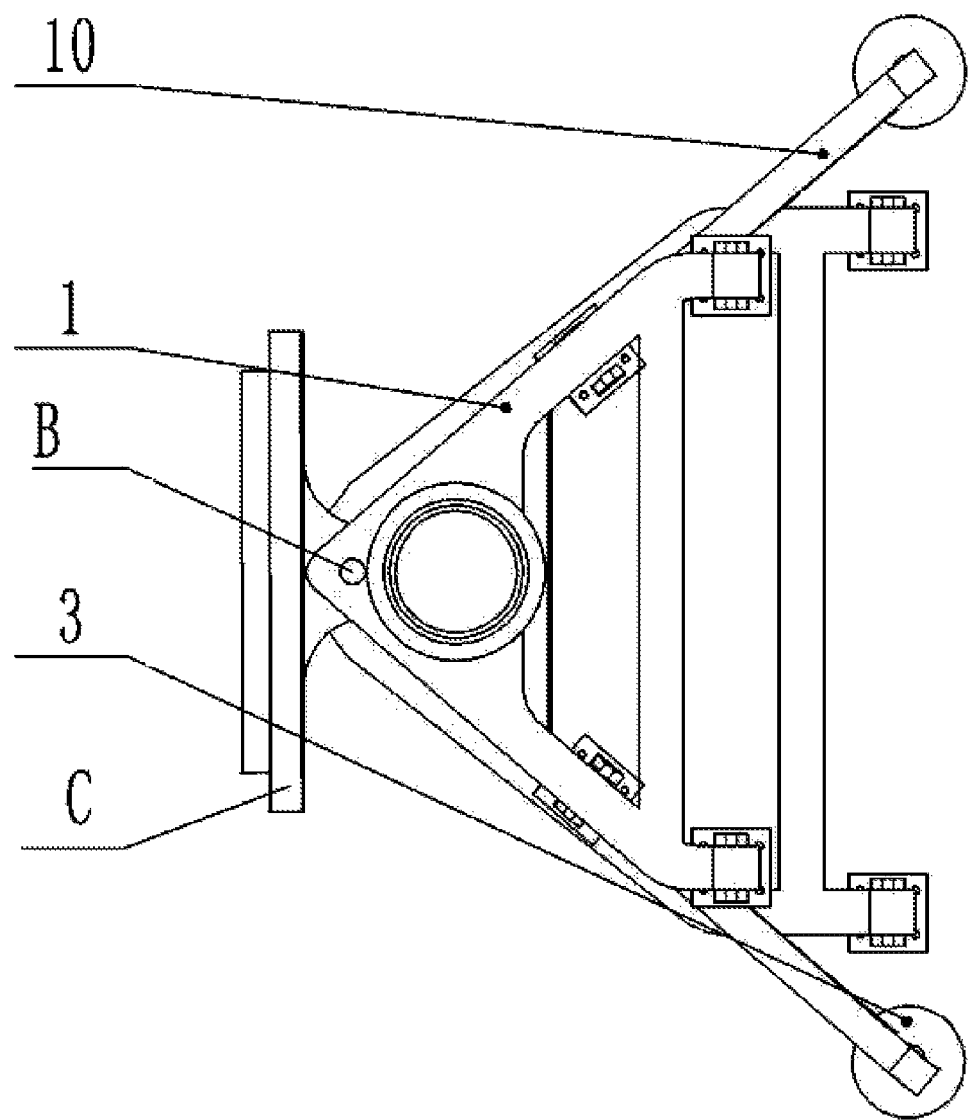
FIG. 10 is a top view of the embodiment of FIG. 9.
Figure 11:
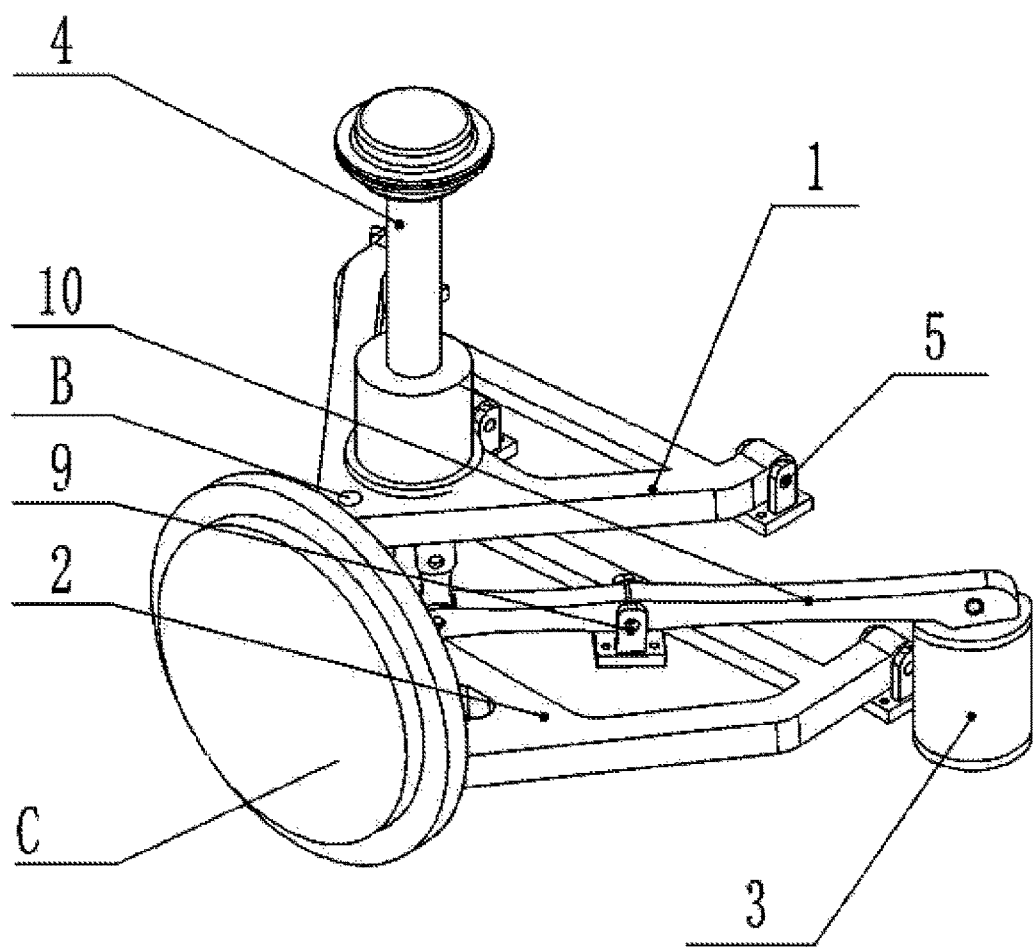
FIG. 11 is an isometric view of the embodiment of FIG. 9.

This embodiment employs a manner of outputting by an output lever, and is shown in FIGS. 9, 10 and 11.

The independent suspension of this embodiment comprises an upper fork arm 1, a lower fork arm 2, fork arm positioning shafts 5, a link rod 8, an output lever rotating shaft 9, an output lever 10, an elastic element 3 and a shock absorber 4. The upper fork arm 1 and the lower fork arm 2 are A-shaped structural elements. Front ends of the upper fork arm 1 and the lower fork arm 2 are respectively connected with an upper suspension point and a lower suspension point of a wheel C through main pins B, and rear ends of the upper fork arm 1 and lower fork arm 2 are connected to the vehicle frame by a fork arm positioning shafts 5 respectively. Two fork arm hanging pivots 81 extend from a bottom of the front portion of the upper fork arm 1. Each fork arm hanging pivot 81 is connected to the output lever 10 by means of a link rod 8. A middle portion of the output lever 10 is hinged to the vehicle frame by means of an output lever rotating shaft 9 and an elastic element 3 is arranged between a bottom of another end of the output lever 10 and the vehicle frame. The shock absorber 4 is mounted between top of the front end of the upper fork arm 1 and the vehicle frame.

Figure 12:
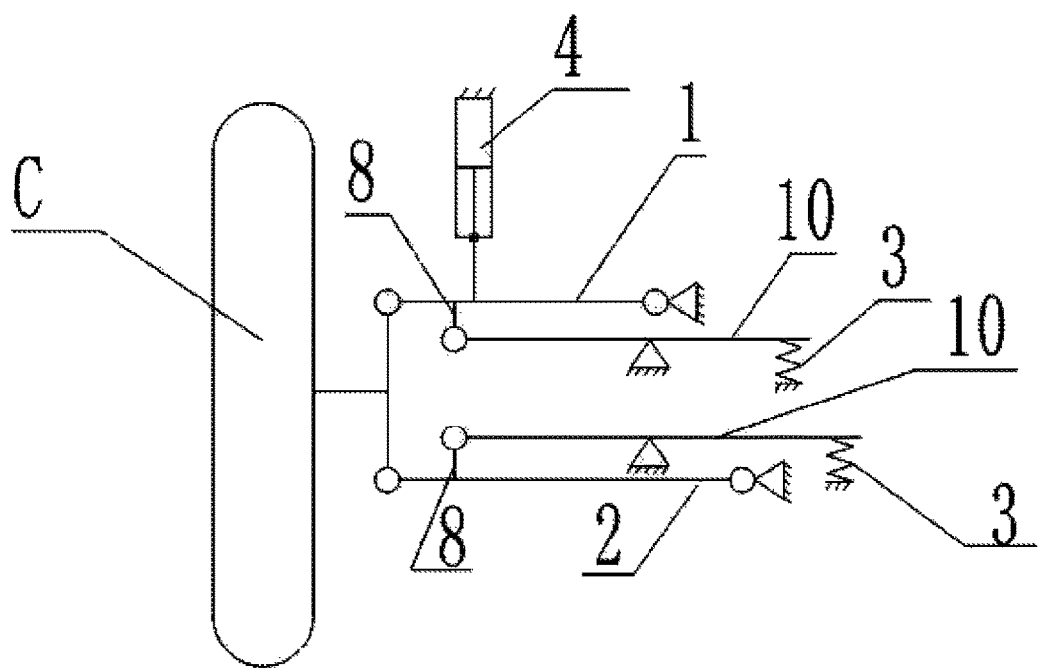
FIG. 12 is a principle illustrative view of the embodiment of FIG. 9.

Two fork arm hanging pivots 81 may also extend from a bottom of the front portion of the lower fork arm 2; each fork arm hanging pivot 81 is connected to the output lever 10 by means of a link rod 8; a middle portion of the output lever 10 is hinged to the vehicle frame by means of an output lever rotating shaft 9; and an elastic element 3 is arranged between a bottom of another end of the output lever 10 and the vehicle frame, as shown in FIG. 12.

The output lever 10 is configured to change an upward movement stroke of the front end of the upper fork arm 1 into a downward movement stroke of the output lever 10 by means of rotating around the fork arm positioning shaft 9, and the downward movement stroke acts on two elastic elements 3 disposed symmetrically on the rear ends, so as to produce the effect of shock absorption. As required by spatial position, the output lever 10 may be provided in parallel to a side of the upper fork arm, or deflect by an angle outwardly, to form a plurality of arrangements so as to be adapted to various vehicle types (vehicle frames). A shock absorber 4 is mounted on top of the front end of the upper fork arm 1, to co-act with the elastic elements 3 to produce shock absorption and dampening effect. Said shock absorber 4 is mounted between the front end of the upper fork arm and the vehicle frame, when the wheel bounces up and down, said elastic elements and said shock absorber 4 are subject to forces simultaneously and they act in cooperation, so as to produce a better shock absorption effect.

A Fourth Embodiment: Angled Arm Transmission Independent Suspension

Figure 13:
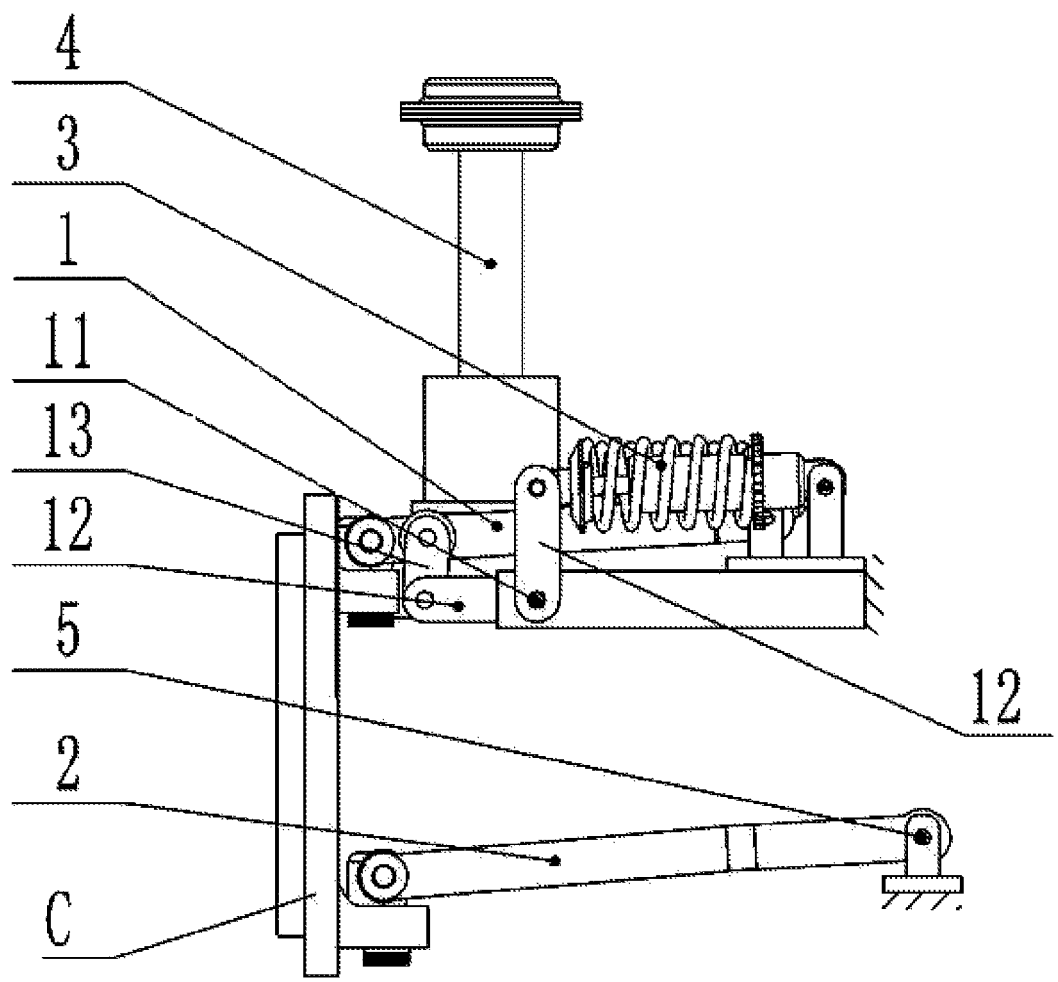
FIG. 13 is a cross-sectional view of a fourth embodiment according to the present application in which a right-angled output arm is provided (referred to as an angled arm transmission independent suspension).
Figure 14:
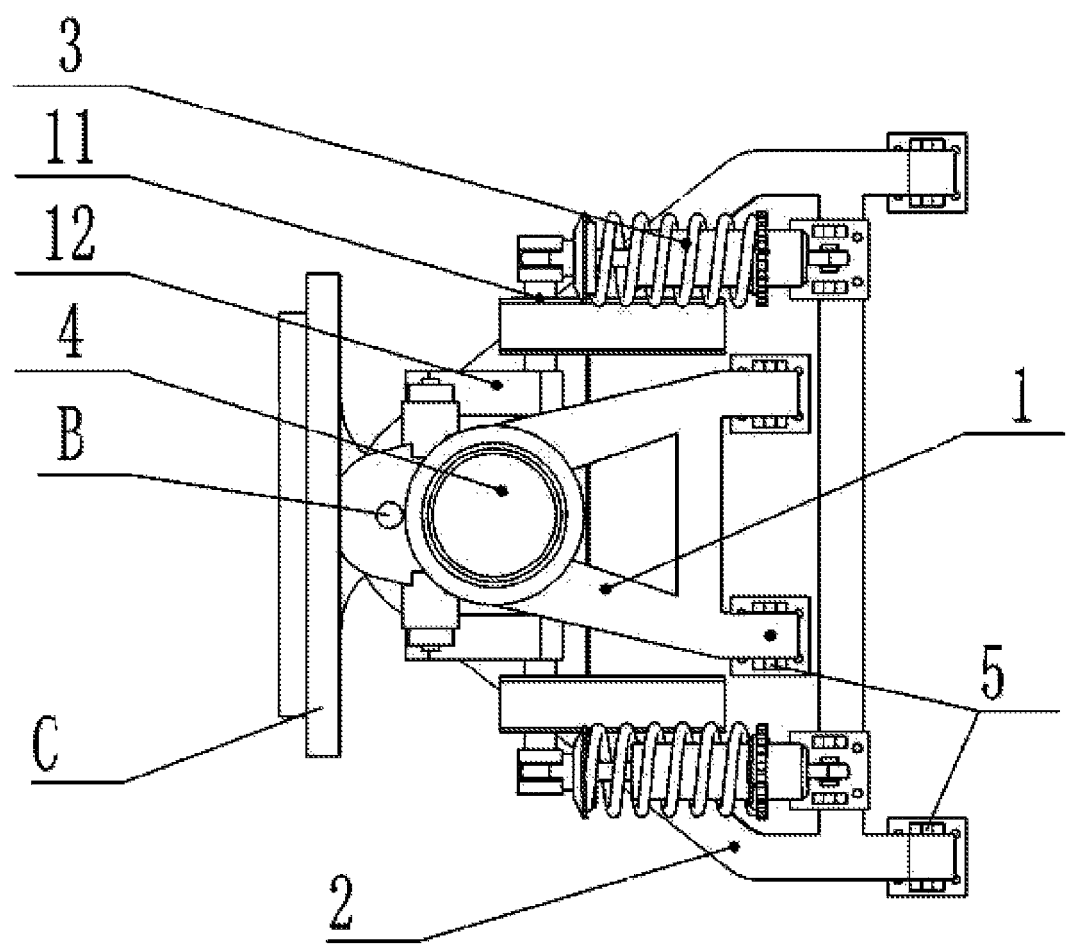
FIG. 14 is a top view of the embodiment of FIG. 13.
Figure 15:
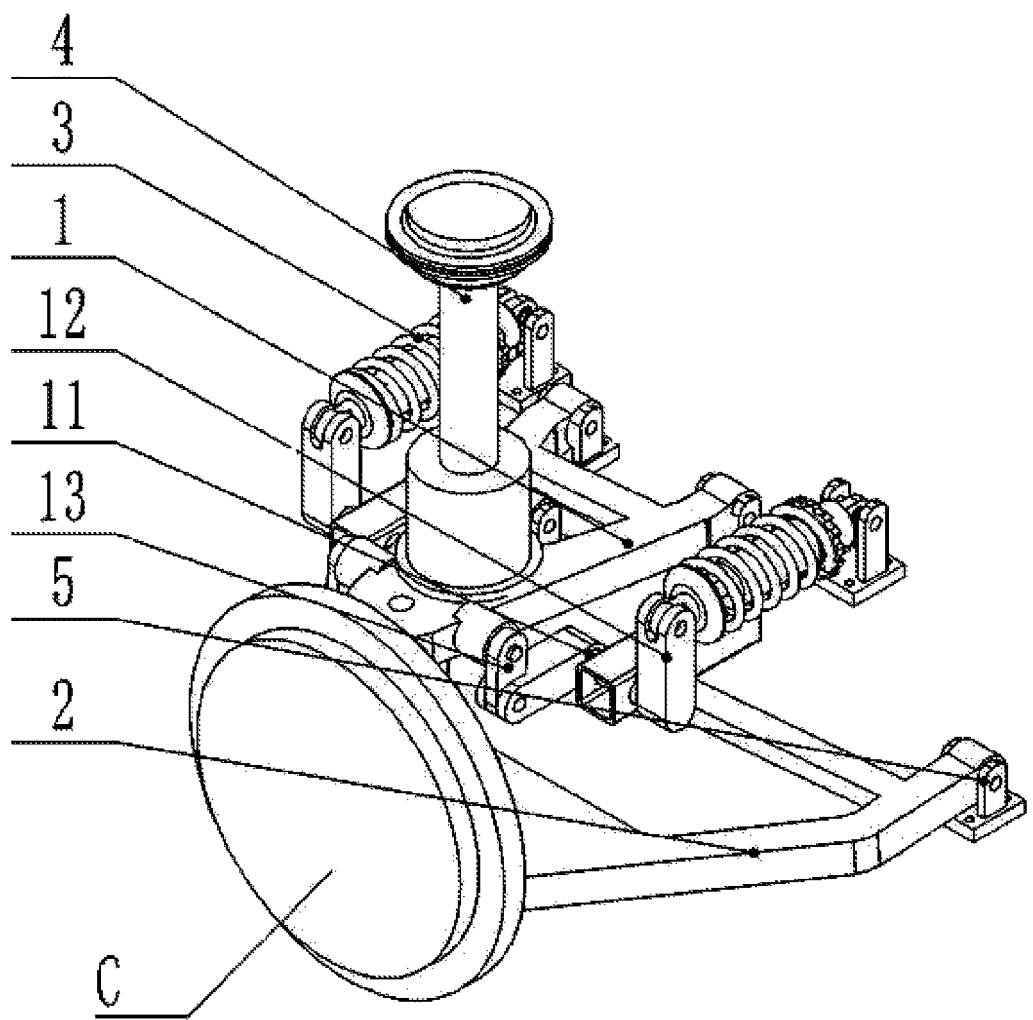
FIG. 15 is an isometric view of the embodiment of FIG. 13.

This embodiment employs a manner of outputting by a right-angled output arm, and is shown in FIGS. 13, 14 and 15.

The independent suspension of this embodiment comprises an upper fork arm 1, a lower fork arm 2, elastic elements 3, a shock absorber 4, fork arm positioning shafts 5, right-angled output arm rotating shafts 11, right-angled output arms 12, and a linking arms 13.

The upper fork arm 1 and the lower fork arm 2 are A-shaped structural elements. Front ends of the upper fork arm 1 and the lower fork arm 2 are respectively connected with an upper suspension point and a lower suspension point of a wheel C through main pins B, and rear ends of the upper fork arm 1 and lower fork arm 2 are connected to the vehicle frame by fork arm positioning shafts 5 respectively. Two connecting arms 13 are hinged on two sides of the front portion of the upper fork arm 1 respectively, and another ends of the connecting arms 13 are hinged to ends of two right-angled output arms 12 respectively. Other ends of the right-angled output arms 12 are connected with two elastic elements 3, another ends of the elastic elements 3 are fixed to the vehicle frame. A right-angled output arm rotating shaft 11 is provided on the right-angled output arm 12 and pivotally connected to the vehicle frame. The shock absorber 4 is disposed between a front end of the upper fork arm 1 and the vehicle frame.

Figure 16:
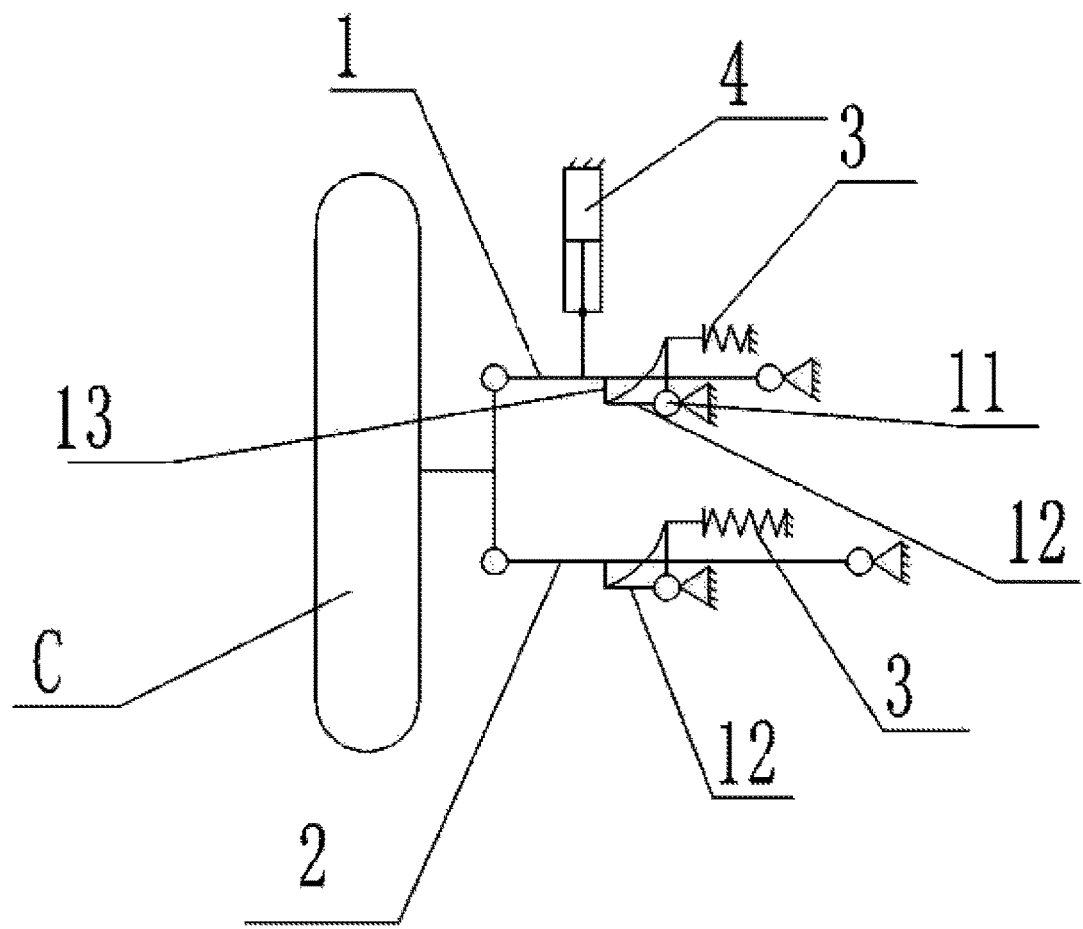
FIG. 16 is a schematic view of the embodiment of FIG. 13.
Figure 17:
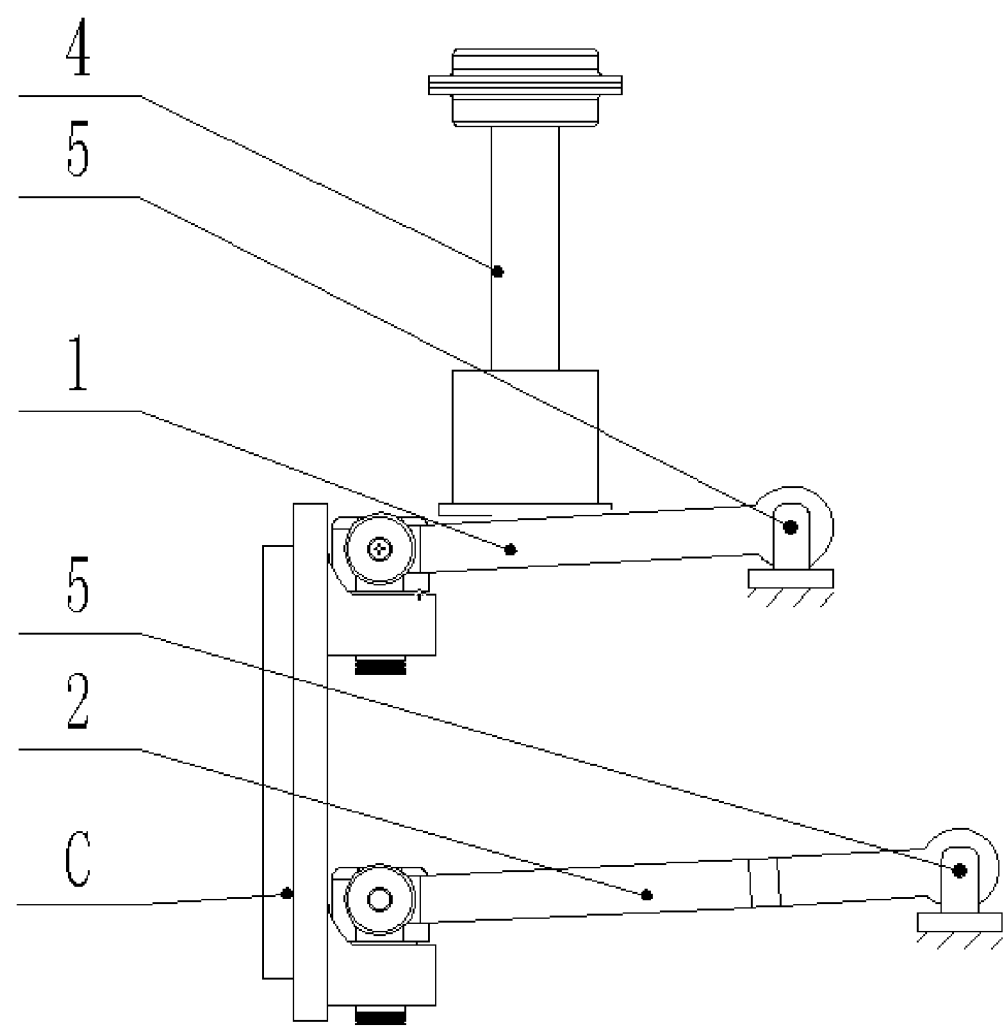
FIG. 17 is a cross-sectional view of a fifth embodiment according to the present application in which a torsion spring twisting around an axle of a fork arm positioning shaft is provided (referred to as a torsion spring direct transmission independent suspension).
Figure 18:
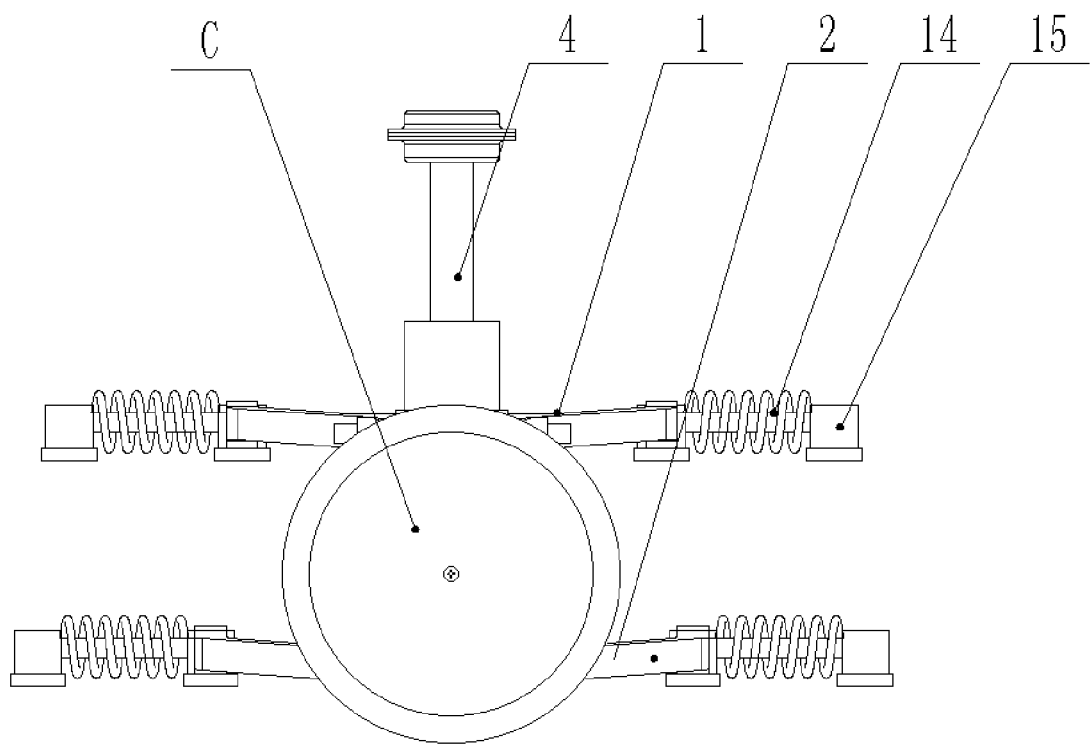
FIG. 18 is a side view of the embodiment of FIG. 17.
Figure 19:
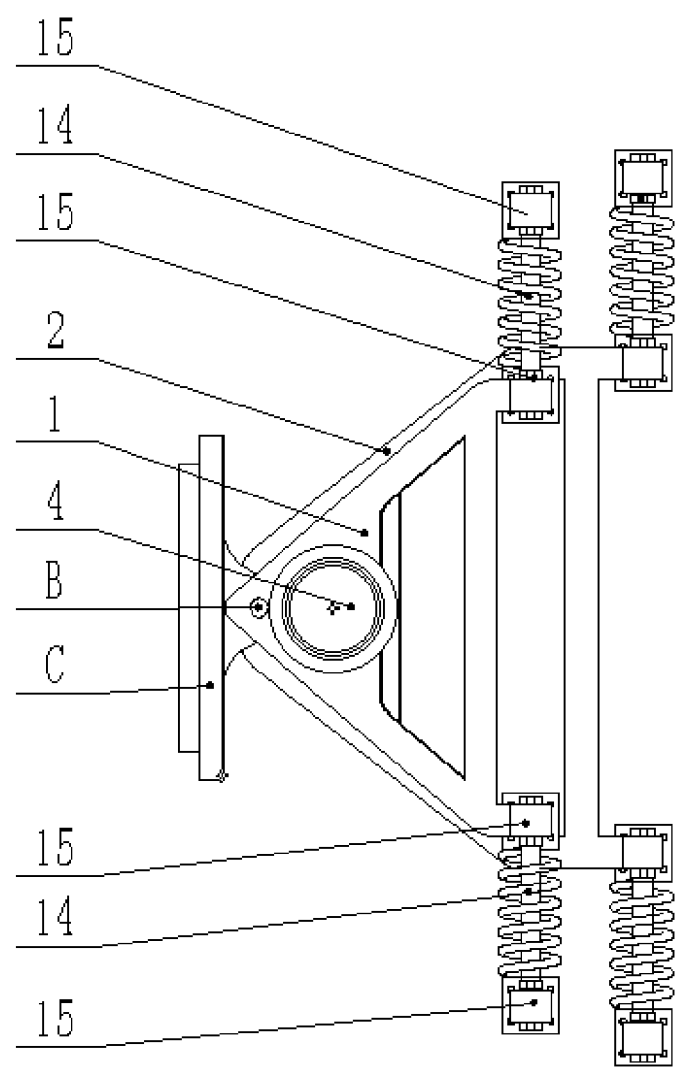
FIG. 19 is a top view of the embodiment of FIG. 17.
Figure 20:
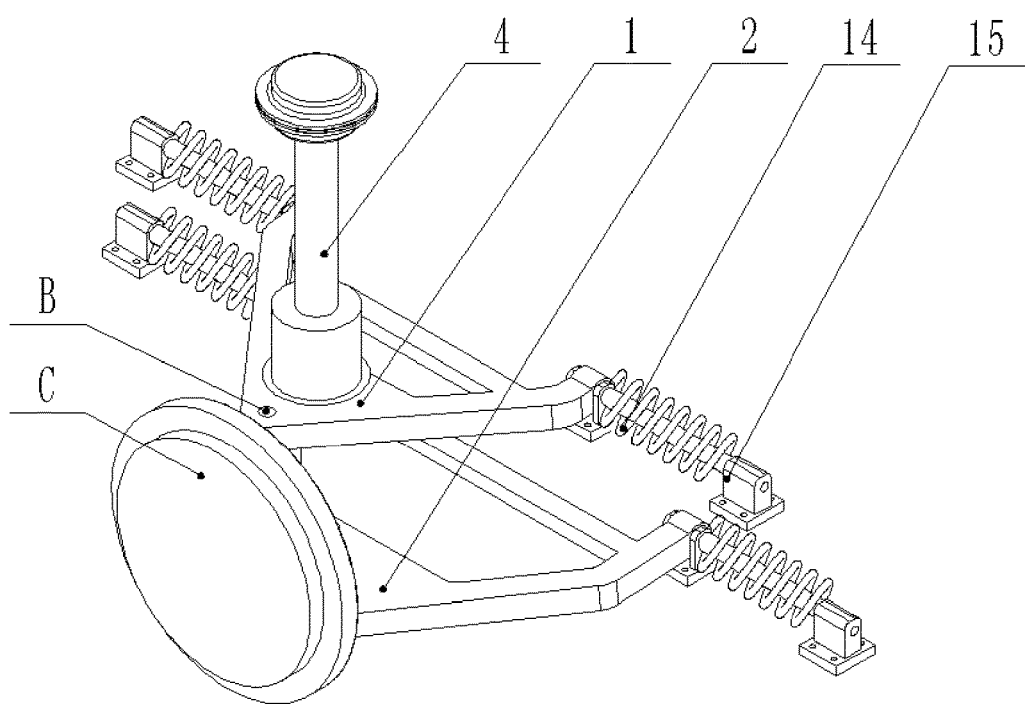
FIG. 20 is a top view of the embodiment of FIG. 17.

Each of opposite sides of a front portion of the lower fork arm 2 may also be hinged with a connecting arm 13; another end of the connecting arm 13 is hinged to an end of the right-angled output arm 12; another end of the right-angled output arm 12 is connected with an elastic element 3; another end of the elastic element 3 is fixed to the vehicle frame; and a right-angled output arm rotating shaft 11 provided on right-angled output arm 12 is pivotally connected to the vehicle frame, as shown in FIG. 16.

The right-angled output arm 12 rotating around the right-angled output arm positioning shaft 11 is configured to change a vertical movement stroke of the front end of the upper fork arm 1 into a lateral movement stroke of the right-angled output arm 12. The lateral movement stroke acts on two elastic elements 3 disposed symmetrically on the rear ends, so as to produce the effect of shock absorption. A shock absorber 4 is mounted on top of the front end of the upper fork arm 1. In operation, the wheel C brings about upward bouncing of the suspension point of the wheel, the shock absorber 4 has a dampening effect. When the wheel C bounces up and down, the shock absorber 4 and the elastic elements 3 are subject to forces simultaneously and act in cooperation. Moreover, the upper fork arm 1 and lower fork arm 2 may each be provided with elastic elements, such that more hanging points may distribute the impact produced by bouncing of the wheel, so as to produce a better shock absorption effect.

A Fifth Embodiment: Torsion Spring Direct Transmission Independent Suspension

This embodiment employs a manner of twisting a torsion spring around an axle of a fork arm positioning shaft, and is shown in FIGS. 17, 18, 19 and 20.

The independent suspension of this embodiment comprises an upper fork arm 1, a lower fork arm 2, fork arm positioning shafts 5, torsional springs 14, a shock absorber 4 and torsion spring seats 15. The upper fork arm 1 and the lower fork arm 2 are A-shaped structural elements. Front ends of the upper fork arm 1 and the lower fork arm 2 are respectively connected with an upper suspension point and a lower suspension point of a wheel C through main pins B, and rear ends of the upper fork arm 1 and lower fork arm 2 are connected to the vehicle frame by torsional springs 14 and torsion spring seats 15. The shock absorber 4 is mounted between top of the front end of the upper fork arm 1 and the vehicle frame.

Vertical bouncing of the wheel C brings about an upward movement of the front end of the upper fork arm 1, and the upper fork arm 1 rotates about a rear fixing point, such that two torsion springs 14 arranged symmetrically on two sides produce a torsional deformation which has the effect of shock absorption. A shock absorber 4 is mounted on top of the front end of the upper fork arm 1. In operation, the wheel C brings about upward bouncing of the suspension point of the wheel, the shock absorber 4 has a dampening effect. Said shock absorber 4 is mounted between the front end of the upper fork arm 1 and the vehicle frame. When the wheel bounces up and down, the shock absorber 4 and the torsional springs 14 are subject to forces on multiple points simultaneously and act in cooperation. Moreover, the upper and lower fork arms may each be provided with torsion springs, such that more hanging points may distribute the impact produced by bouncing of the wheel, so as to produce a better shock absorption effect.

The invention claimed is:

1. A multi-bearing-point independent suspension, comprising:
    an upper fork arm, a lower fork arm, elastic elements, a shock absorber, fork arm positioning shafts, link rods and output levers;

wherein:
the upper fork arm and the lower fork arm are A-shaped structural parts;
front ends of the upper fork arm and the lower fork arm are respectively connected with an upper suspension point and a lower suspension point of a wheel through main pins;
rear ends of the upper fork arm and lower fork arm are connected to the vehicle frame by fork arm positioning shafts respectively;
two fork arm hanging pivots extend from bottom of the front portion of the upper fork arm;
a lower end of each fork arm hanging pivot is connected to an output lever by means of a link rod;
a middle portion of the output lever is hinged to the vehicle frame by means of an output lever rotating shaft;
an elastic element is arranged between bottom of another end of the output lever and the vehicle frame, and
the shock absorber is mounted on top of the front end of the upper fork arm.

2. The multi-bearing-point independent suspension according to claim 1, wherein two fork arm hanging pivots extend from a bottom of the front portion of the lower fork arm, a lower end of each fork arm hanging pivot is connected to an output lever by a link rod, a middle portion of the output lever is hinged to the vehicle frame by an output lever rotating shaft, and an elastic element is arranged between a bottom of another end of the output lever and the vehicle frame.

* * * * *